United States Patent [19]
Swiecicki

[11] 3,923,417
[45] Dec. 2, 1975

[54] HYDRAULIC TURBINE SPIRAL CASE DRAIN

[75] Inventor: Ignacy Swiecicki, York, Pa.

[73] Assignee: Allis-Chalmers Corporation, Milwaukee, Wis.

[22] Filed: Dec. 30, 1974

[21] Appl. No.: 537,604

[52] U.S. Cl. ............................. 415/110; 415/151
[51] Int. Cl.² .................................. F03B 13/06
[58] Field of Search ............... 415/1, 24, 110, 151

[56] References Cited
UNITED STATES PATENTS

| | | | |
|---|---|---|---|
| 1,529,634 | 3/1925 | Nagler | 415/24 |
| 2,082,927 | 6/1937 | White | 415/110 |
| 3,174,719 | 3/1965 | Sproule et al. | 415/110 |
| 3,174,720 | 3/1965 | Sproule | 415/110 |
| 3,237,564 | 3/1966 | Hartland | 415/1 |
| 3,238,534 | 3/1966 | Hartland | 415/1 |
| 3,239,193 | 3/1966 | Kerensky | 415/1 |
| 3,279,378 | 10/1966 | Sproule | 415/110 |
| 3,398,696 | 8/1968 | Sproule | 415/1 |
| 3,447,782 | 6/1969 | Sproule | 415/24 |

FOREIGN PATENTS OR APPLICATIONS

| | | | |
|---|---|---|---|
| 685,965 | 5/1964 | Canada | 415/110 |
| 825,456 | 10/1969 | Canada | 415/110 |

*Primary Examiner*—Henry F. Raduazo
*Attorney, Agent, or Firm*—John P. Hines

[57] ABSTRACT

A hydraulic turbine is provided with means for admitting pressurized air into the runner housing to depress the water in the draft tube. Wicket gates are provided to isolate the runner from water in the spiral case. A shutoff valve in the penstock isolates the spiral case and wicket gates from the water pressure in the forebay. A water passageway connects the water in the draft tube to the water in the space between the shutoff valve and the wicket gates. This water passageway passes through an elevation higher than the highest point of the spiral case and it is exposed to the air pressure in the draft tube to insure that the water in the space between the shutoff valve and wicket gates is not siphoned into the draft tube.

7 Claims, 2 Drawing Figures

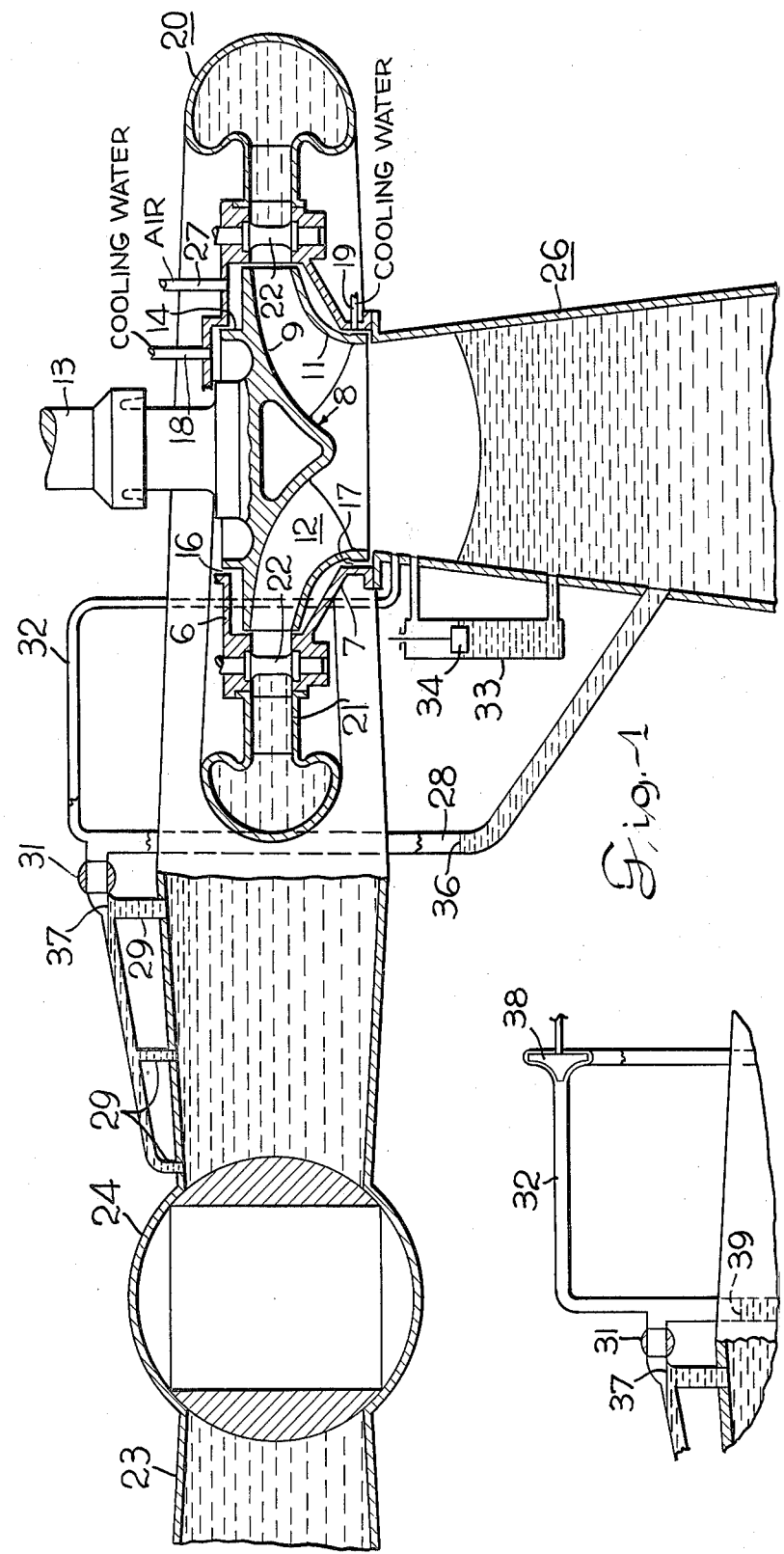

HYDRAULIC TURBINE SPIRAL CASE DRAIN

This invention relates in general to hydraulic machinery such as pumps, hydraulic turbines and reversible pump turbines. More specifically, the invention is directed to a hydraulic machine wherein a fluid such as air is utilized to depress the working fluid such as water from the runner or impeller housing to permit rotation thereof under less resistance.

It is common practice in hydraulic machinery to provide means such as air pressure to evacuate the water from the runner when the turbine is not rotating the generator to produce electrical power. In some instances, the turbine is in what is referred to as the condensing operation wherein its electrical output is not in the form of electric power. However, the turbine is maintained at synchronous speed so that it can quickly be brought into the power generating mode. In other instances the water is evacuated from the runner housing when it is desired to start the reversible pump turbine in the pumping mode.

In either instance, evacuation of the runner housing is accomplished by closing the wicket gates and then admitting high-pressure air into the runner housing. In many instances it has been found desirable to not only close the wicket gates but to also close the penstock shutoff valve thereby isolating the water in the spiral case and limiting the pressure on the outside of the wicket gates to a pressure just above the pressure of the water in the draft tube. While the turbine is rotating in air, it is necessary to provide cooling water to prevent an excessive temperature increase in the machine. The cooling water is usually admitted at the runner seals. This water is acted upon by the runner and when its pressure exceeds the pressure of the water in the spiral case, it will seep through the wicket gates into the spiral case. Therefore, in many instances a water overflow passageway is provided between the spiral case and the draft tube. Such an arrangement is shown in U.S. Pat. No. 1,860,618 issued to Forrest Nagler, May 31, 1932. This passageway is provided to permit any excess water in the spiral case to flow to the draft tube thereby limiting the pressure of the water in the spiral case.

In certain instances, however, it may be possible to create a siphoning action between the spiral case and the draft tube through this overflow passage. If sufficient water leaks past the wicket gates into the spiral case and is forced through the overflow tube, such a siphoning action may take place which would result in removal of more than just the excess water from the spiral case. This is an undesirable situation whenever the machine is put back into operation either as a pump or as a turbine. If too much water has been evacuated from the spiral case and either the wicket gates or the penstock shutoff valve is opened, considerable water hammer may take place to the point of damaging the machine or at least adversely affecting normal flow characteristics.

It is the intention and general object of this invention to provide an inexpensive means to insure that the water in the spiral case does not siphon into the draft tube through the overflow passage.

Another object of the subject invention is to provide a hydraulic turbine of the hereinbefore described type wherein the overflow passage is exposed to the air pressure in the draft tube thereby permitting only excess water to flow through the overflow passage.

A more specific object of the subject invention is to provide a hydraulic turbine of the hereinbefore described type wherein an air pump connected to the overflow passage reduces the pressure head of water against which the turbine runner operates to pump the cooling water from the runner housing into the spiral case.

These and other objects of the subject invention will become more fully apparent when the following description is read in light of the attached drawings wherein:

FIG. 1 is a side elevation of a portion of a hydraulic machine constructed in accordance with this invention; and FIG. 2 is a modified form of the invention.

Referring to the drawing, 6 represents the headcover and 7 the bottom ring which together form a housing for the runner generally designated 8. The runner is composed of a crown 9, a band 11 and a plurality of circumferentially spaced vanes 12 connected between the band and crown. The runner is supported by a shaft 13 which is connected to a dynamoelectric machine (not shown) for the production of electricity when the machine is operating as a turbine and to be driven thereby when the machine is operated as a pump.

Sealing means are provided between the runner and the housing in any conventional manner. Such sealing means are herein shown for purposes of illustration as an annular shoulder 14 provided on the upper surface of the crown 9 which rotates closely adjacent to a complementary surface on the headcover 6 providing a seal 16 therebetween. An additional runner seal 17 is provided between the band 11 and the bottom ring 7. When the turbine is operating in water, sufficient water works through these seals to provide cooling therefor. However, when the runner is operating in air, cooling water may be supplied to the seals and this is herein provided for by means of the cooling water pipes 18 and 19.

An annular stay ring 21 is provided about and connected to the runner housing and provides an annular passageway to the runner 8. A plurality of circumferentially spaced wicket gates 22 are pivotally supported between the headcover 6 and the bottom ring 7. Conventional means (not shown) may be provided to pivot the wicket gates between opened and closed positions.

A spiral case generally designated 20 is connected to the stay ring 21 on the side opposite from the wicket gates 22. A penstock 23 has one end thereof connected to the spiral case and its other end connected to the headwater (not shown) of the hydraulic installation. A shutoff valve herein shown as a spherical valve 24 is interposed between the penstock 23 in the spiral case to permit isolation of the headwater from the turbine.

A draft tube generally designated 26 is connected to the bottom ring 7 and provides a water passageway open to the turbine runner 8. The draft tube 26 connects the turbine to the tailwater (not shown) of the hydraulic installation.

As previously mentioned, there are certain times when it is desirable to permit the runner 8 to rotate in air rather than in water. This is accomplished by providing pressurized air to the runner housing in any conventional manner. As herein shown for purposes of illustration, an air pipe 27 is provided through the headcover 6 and is connected to a source (not shown) of high-pressure air. With the wicket gates 22 closed and the spherical valve 24 also closed, high-pressure air is admitted through the pipe 27 into the runner housing. This depresses the water into the draft tube 26 in the manner shown in the drawings. Once all of the water is removed from the runner housing the runner is permitted to rotate with only slight relative resistance. However, while the runner is rotating in air the seals 16 and 17 are not being cooled. Therefore, cooling water often is sprinkled on the seals to insure that they do not overheat and result in rubbing contact which would seriously damage the seals. The water which is sprinkled onto the seals is acted upon by the rotating runner and centrifugal force is imparted thereto. Because in most instances the wicket gates 22 do not provide a complete seal, the cooling water and some air will seep through the wicket gates into the spiral case. However, once in the spiral case a complete seal is provided by the spherical valve and provision must be made to permit the excess water to drain from the spiral case. It is known to provide an overflow passageway between the spiral case and the draft tube to take care of this excess water. However, in the prior art this passageway was not provided with means to insure that a siphoning effect did not occur which would siphon more than the excess water from the spiral case resulting in air pockets in the spiral case. Air pockets in the spiral case are undesirable since when the turbine is again operated either as a pump or a turbine the air pockets create an effect known as water hammer which can result in serious damage to the machine.

This invention provides an overflow passageway from the spiral case to the draft tube which limits the water passing therethrough to the excess water in the spiral case thereby insuring that air pockets do not form in the spiral case. To this end an overflow passage 28 connects the draft tube 26 to the upper portion of the spiral case 20. The passageway 28 may be provided with three or more connections 29 to the top portion of the spiral case. It is preferable that the connections 29 to the spiral case 20 are at the top portion thereof so that any air bubbles that may form in the spiral case will flow upward into the overflow passage 28. A shutoff valve 31 is provided in the overflow passage to block this passageway when the machine is operating in its normal manner. An air passage 32 has one end thereof connected to the overflow passageway 28 to expose this passageway to the air pressure in the draft tube. The other end of the air passage 32 may be conveniently connected to any part of the turbine or the source of pressurized air and is herein shown for purposes of illustration connected to the draft tube 26 above the level of the depressed water.

Any form of air pressure control may be provided to insure proper air pressure in the runner housing. As herein shown for purposes of illustration, an air pressure control is shown in the form of a tube 33 having its lower end exposed to the water pressure in the draft tube 26 and the upper end connected to the draft tube above the level of the depressed water. A float 34 provided in the tube 33 is connected to the source of air pressure (not shown) in any conventional manner (not shown) to insure additional air into the runner housing when the level of the depressed water exceeds a predetermined level.

When the seal cooling water is acted upon by the rotating runner 8, it is pressurized and leaks through the wicket gates 22 into the spiral case 20. Excess water in the spiral case fills the connections 29 until the excess water reaches the level of the overflow passage 28 and flows into the draft tube 26. However, because of the presence of the air duct 32, siphoning of the water from the spiral case will not occur because the air supply through the air passage 32 will break any siphoning action which may occur.

In certain instances the runner 8 will not be capable to develop sufficient pressure head to raise the water in passageway 29 to the elevation 37. The elevation of the water column is the difference between the level of the water 36 in the overflow passage and the level of the water 37 as shown in FIG. 2. This is undesirable since cooling water would then collect in the runner housing and resist rotation of the runner 8 resulting in wasted horsepower. This drawback can be overcome by connecting an air pressure reducing means such as an air pump 38 to the overflow passage 28. Such an air pump would operate in a manner to reduce the air pressure in overflow passage 28 and permit the water to rise to a level as for instance 39. This level 39 will vary depending on the ability of the runner 8 to pressurize the cooling water. However, in no event should the air pressure in overflow passage 28 be less than that required to prevent a siphoning action to develop in the overflow passage between the spiral case 20 and the draft tube 26.

From the above description it can be seen that simplified automatic means are provided to permit the flow of excess water from the spiral case to the draft tube and at the same time prohibit a siphoning of water from the spiral case which could result in the formation of air pockets and detrimental water hammer to the hydraulic machine.

The embodiments of the invention in which an exclusive property or privilege is claimed are defined as follows:

1. A hydraulic machine comprising:
   a housing;
   a rotor mounted for rotation in said housing;
   a spirally wound water case located about and connected to said housing in water communication with said rotor;
   a tube connected to said housing in water communication with said rotor, said rotor located between said spiral case and said tube in the water path of said hydraulic machine;
   a plurality of circumferentially spaced gate means connected to said spiral case selectively movable to permit and substantially interrupt the flow of water through said rotor;
   valve means connected to said spiral case in spaced relation from said gate means operable to permit and interrupt the flow of water through said spiral case;
   means for admitting air into said housing to depress the water from about said rotor to a level below the level of water in said spiral case when said gates and said valve are in the water interrupting positions such differential in water level resulting in a pressure head therebetween;
   water overflow passage means connecting said spiral case between said valve and said gate means in water communication with said tube; and
   air pressure means connected to said overflow water passage means providing air thereto at a pressure sufficient to prohibit a siphoning action from said spiral case to said tube.

2. The hydraulic machine set forth in claim 1 and further comprising means for sensing the water level in said tube connected to said air means and operable to cause said air means to increase the pressure of air in said housing when the water in said tube exceeds a predetermined level.

3. The hydraulic machine set forth in claim 1 wherein said air pressure means is an air passageway connected to said rotor housing and said overflow water passage means.

4. The hydraulic machine set forth in claim 1 wherein said overflow water passage means is connected to said spiral case at the highest level thereof.

5. The hydraulic machine set forth in claim 4 wherein a plurality of spaced connections are provided between the uppermost points of said spiral case and said overflow water passage means.

6. A hydraulic machine comprising:
   a housing;
   a rotor mounted for rotation in said housing;
   a restricted fluid passage between said rotor and said housing defining a water seal therebetween;
   a spirally wound water case located about and connected to said housing in water communication with said rotor;
   a tube connected to said housing in water communication with said rotor, said rotor located between said spiral case and said tube in the water path of said hydraulic machine;
   a plurality of circumferentially spaced gate means connected to said spiral case selectively movable to permit and substantially interrupt the flow of water through said rotor;
   valve means connected to said spiral case in spaced relation from said gate means operable to permit and interrupt the flow of water through said spiral case;
   air pressure means for admitting air into said housing to depress the water from about said rotor to a level below the level of water in said spiral case when said gates and said valve are in the water interrupting positions such differential in water level resulting in a pressure head therebetween of a first magnitude;
   cooling water means for admitting water to said seals to cool same while said rotor is rotating in air;
   water overflow passage means connecting said spiral case between said valve and said gate means in water communication with said tube, a portion of said passage being disposed above the highest normal water level in said spiral case and said tube so that an air pocket interface may be formed therebetween;
   air passageway means connecting said overflow water passage means to the air pressure in said rotor housing; and
   pressure reducing means connected to said overflow water passage means to reduce the magnitude of the air pressure therein below the pressure in the rotor housing when said rotor is operating in air.

7. The hydraulic machine set forth in claim 6 wherein said pressure reducing means is an air pump.

* * * * *